(12) United States Patent
Kojima et al.

(10) Patent No.: US 7,422,923 B2
(45) Date of Patent: Sep. 9, 2008

(54) PHOTOELECTRIC TRANSDUCER AND ITS MANUFACTURING METHOD

(75) Inventors: Katsunori Kojima, Ibaraki (JP); Teruhisa Miyata, Takatsuki (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/787,805

(22) Filed: Apr. 18, 2007

(65) Prior Publication Data

US 2007/0194311 A1    Aug. 23, 2007

Related U.S. Application Data

(62) Division of application No. 10/489,793, filed as application No. PCT/JP03/07531 on Jun. 13, 2003, now Pat. No. 7,224,036.

(30) Foreign Application Priority Data

Jun. 14, 2002    (JP)    ............... 2002-174864

(51) Int. Cl.
*H01L 21/00*    (2006.01)
(52) U.S. Cl. .............. 438/63; 438/48; 438/57
(58) Field of Classification Search ............ 438/48, 438/57, 63
See application file for complete search history.

(56) References Cited

U.S. PATENT DOCUMENTS

2004/0067613 A1    4/2004   Murofushi et al.

FOREIGN PATENT DOCUMENTS

| JP | 2001-043907 | 2/2001 |
|---|---|---|
| JP | 2001-102101 | 4/2001 |
| JP | 2001-185245 | 7/2001 |
| JP | 2001-313444 | 11/2001 |
| WO | 02067357 | 8/2002 |

OTHER PUBLICATIONS

Japanese Examination Report (Notification of Reasons for Refusal) dated Oct. 30, 2007, issued in JP Patent Application No. 2004-514176 and the English Translation (6 pages).
Patent Abstracts of Japan issued for Publication No. 2001-185245 dated Jul. 6, 2001 (27 pages).

(Continued)

*Primary Examiner*—Douglas M Menz
(74) *Attorney, Agent, or Firm*—Osha Liang LLP

(57) ABSTRACT

A photoelectric transducer comprises an electrode (5) on which a semiconductor layer (7) carrying a sensitizing dye is deposited. The semiconductor layer (7) contains semiconductor particles and a binder and has a porosity of 40 to 80%. A method for manufacturing a photoelectric transducer by applying a solution containing semiconductor particles and a binder to an electrode (5), drying the electrode, and pressing the electrode under a pressure of 20 to 200 Mpa so as to form a semiconductor layer (7) is also disclosed. By the method, a photoelectric transducer comprising a semiconductor layer where a conduction path of photo-excited electrons is ensured without sintering the semiconductor layer at a high temperature and which has an adhesive power adaptable to the flexibility of the base and exhibiting excellent photoelectric transducing characteristics can be provided.

6 Claims, 1 Drawing Sheet

OTHER PUBLICATIONS

Patent Abstracts of Japan issued for Publication No. 2001-043907 dated Feb. 16, 2001 (25 pages).

Patent Abstracts of Japan issued for Publication No. 2001-102101 dated Apr. 13, 2001 (23 pages).

Patent Abstracts of Japan issued for Publication No. 2002-313444 dated Oct. 25, 2002 (21 pages).

K. Kojima et al., "Film type Shikiso Zokan Taiyo Denchi no Sakusei", The Electrochemical Society of Japan Dai 69 Kai Taikai Koen Yoshishu, The Electrochemical Society of Japan, p. 252, Lecture No. 3122 with English Translation (2002).

PHOTOELECTRIC TRANSDUCER AND ITS MANUFACTURING METHOD

CROSS REFERENCE TO RELATED APPLICATIONS

This application is a divisional application of U.S. Pat. No. 10/489,793 filed on Mar. 16, 2004, which is a National Stage Application of PCT/JP03/07531 filed on Jun. 13, 2003.

TECHNICAL FIELD

The present invention relates to a photoelectric transducer used for a dye-sensitized solar cell and the like.

BACKGROUND ART

A dye-sensitized solar cell of a new type reported in a journal "Nature" in 1991 by Graetzel et al. received attention as exhibiting a remarkably high conversion efficiency (on the order of 7%) compared with conventional dye-sensitized solar cells. A dye-sensitized solar cell realizes a photoelectric conversion by injecting excited electrons generated by a dye that has collected light to a semiconductor. Thus, it is important that a large amount of sensitizing dye is carried on a semiconductor so as to enhance a light collecting ability, and electrons are injected to a semiconductor as fast as possible from the sensitizing dye. The new dye-sensitized solar cell that also is called a Graetzel cell solves this problem by allowing a porous film made of titanium oxide of ultrafine particles to carry a ruthenium complex that is a sensitizing dye.

The Graetzel cell can be assembled merely by coating a transparent electrode with a paste in which ultrafine particles of titanium oxide are dispersed, allowing the transparent electrode to carry a sensitizing dye, and filling an electrolyte between the transparent electrode and a counter electrode. Compared with conventional solar cells, the Graetzel cell can be produced with a simple apparatus, so that it receives attention as one of the next generation solar cells.

A major feature of the Graetzel cell is to use a porous semiconductor film obtained by sintering titanium oxide of ultrafine particles. The purpose of sintering titanium oxide is to allow ultrafine particles of a semiconductor to bind each other, and to ensure a conducting path for optically excited electrons injected from a sensitizing dye. Usually, the sintering temperature of titanium oxide for ensuring a conducting path for optically excited electrons is in a range of 450° C. to 550° C. When the sintering temperature is less than this range, the binding between the ultrafine particles of a semiconductor becomes insufficient. Because of this, unless a material having a softening temperature higher than the sintering temperature is selected as a substrate of a transparent electrode for forming a porous titanium oxide film, the transparent electrode actually cannot be used. However, most of the materials having light transparency have a softening temperature lower than the sintering temperature of titanium oxide. Therefore, it is difficult to use such a material as an electrode substrate of the Graetzel cell.

Furthermore, when a film is used as a substrate of the Graetzel cell, for example, a roll-to-roll continuous manufacturing process described in WO 97/15959 and a production method suitable for mass-production described in WO 99/66519 can be adopted, and the Graetzel cell can be produced at a lower cost than the existing solar cells. Therefore, the film type Graetzel cell can be deployed for a very wide use. However, when a film is used as a substrate, a porous titanium oxide film made of ultrafine particles cannot handle the flexibility of the film, and becomes likely to crack or peel off. Furthermore, in WO 93/20569, a method for adding a surfactant "TRITON X-100" of a nonionic type to a titanium oxide paste for the purpose of reducing cracking of a coating film during coating of the titanium oxide paste is described. In this method, as much as 40% by mass of "TRITON X-100" is added to titanium oxide, which may inhibit the transfer of electrons in a titanium oxide film.

Furthermore, in WO 00/72373, by applying a pressure of 100 to 1000 $kg/cm^2$ to a titanium oxide film, the mechanical strength and electron conducting path of the titanium oxide film are ensured without sintering titanium oxide. This technique is characterized in that a binder is not contained in a titanium oxide film so as to avoid the inhibition of electron transfer in a titanium oxide film by a binder.

On the other hand, the inventors of the present invention confirmed that a titanium oxide film with mechanical strength to some degree can be obtained by applying a large pressure to the titanium oxide film. However, the film thus obtained has weak adhesion with respect to a substrate, and the titanium oxide film is likely to peel off.

DISCLOSURE OF INVENTION

A photoelectric transducer of the present invention includes: a first electrode with a semiconductor layer carrying a sensitizing dye formed thereon; a second electrode opposed to the semiconductor layer of the first electrode; and an electrolyte layer placed between the semiconductor layer of the first electrode and the second electrode. The semiconductor layer contains semiconductor particles and a binder, and a porosity of the semiconductor layer is in a range of 40 to 80%.

Furthermore, a method for producing a photoelectric transducer of the present invention includes: a first electrode with a semiconductor layer carrying a sensitizing dye formed thereon; a second electrode opposed to the semiconductor layer of the first electrode; and an electrolyte layer placed between the semiconductor layer of the first electrode and the second electrode. A solution containing semiconductor particles and a binder is applied to the first electrode and dried, and then, pressed with a pressure of 20 to 200 MPa, whereby the semiconductor layer is formed.

BEST MODE FOR CARRYING OUT THE INVENTION

Figure 1:
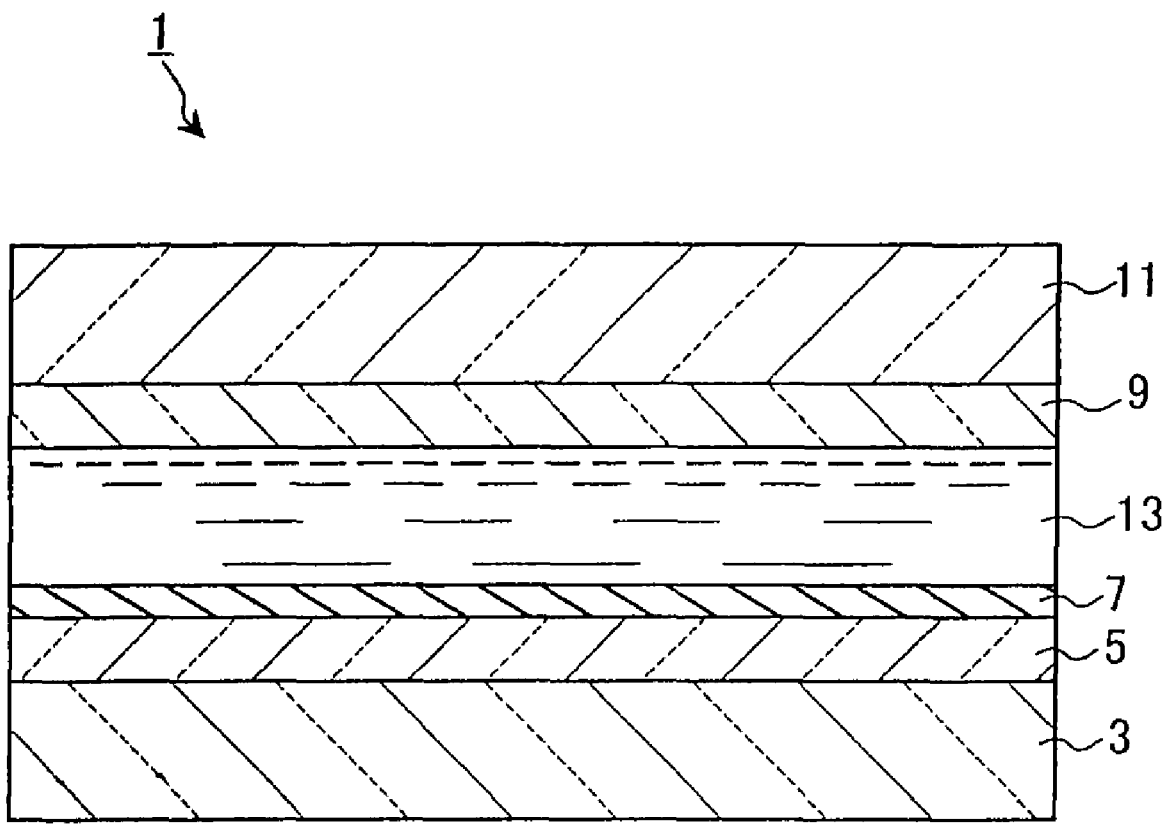
FIG. 1 is a schematic cross-sectional view showing an exemplary photoelectric transducer of the present invention.

The present invention can solve the conventional problems, and provides a photoelectric transducer exhibiting excellent photoelectric conversion characteristics, using a semiconductor layer with strong adhesion capable of ensuring a conducting path for optically excited electrons without being sintered at a high temperature and handling the flexibility of a substrate, and a method for producing the photoelectric transducer. Hereinafter, the embodiments of the present invention will be described.

An exemplary photoelectric transducer of the present invention includes: a first electrode with a semiconductor layer carrying a sensitizing dye formed thereon; a second electrode opposed to the semiconductor layer of the first electrode; and an electrolyte layer placed between the semiconductor layer of the first electrode and the second electrode.

The semiconductor layer contains semiconductor particles and a binder, and a porosity of the semiconductor layer is in a range of 40 to 80%.

Since the semiconductor layer contains semiconductor particles and a binder, a semiconductor layer with strong adhesion capable of handling the flexibility of a substrate can be realized. Furthermore, due to the porosity of the semiconductor layer in a range of 40 to 80%, a conducting path for optically excited electrons can be ensured even without sintering the semiconductor layer at a high temperature, whereby a conversion efficiency can be enhanced.

Furthermore, in the photoelectric transducer of one embodiment, it is preferable that a ratio of the binder contained in the semiconductor layer is in a range of 0.2 to 10% by mass with respect to a total component forming the semiconductor layer. This is because a conversion efficiency is enhanced further in this range.

Furthermore, in the photoelectric transducer of one embodiment, it is preferable that the binder contains at least one selected from the group consisting of a cellulose derivative, a rubber elastic polymer, a single polymer or a copolymer of N-vinylacetamide, polyethylene oxide, sodium alginate, polyacrylic acid and its salt, polyvinylphenol, polyvinyl methyl ether, polyvinyl alcohol, polyvinyl pyrolidone, polyacrylamide, polyhydroxy(meth)acrylate, polyvinyl acetal, a styrene-maleic acid copolymer, polyethylene glycol, starch oxide, phosphorylated starch, casein, and polyolefin. These materials have strong adhesion and are sufficiently flexible, so that a semiconductor layer capable of handling the flexibility of a substrate more pliably can be realized.

Furthermore, in the photoelectric transducer of one embodiment, it is preferable that the first electrode is configured with an electrode portion adhering to a synthetic resin film. According to this, electrodes can be mass-produced easily, resulting in a reduction in a production cost.

Furthermore, in the photoelectric transducer of one embodiment, it is preferable that the synthetic resin film is at least one selected from the group consisting of a polyethylene terephthalate film, a polyethylene naphthalate film, a polyether sulphone film, a polyarylate film, a polyimide film, a cycloolefin polymer film, and a norbornene resin film. This is because these films are excellent in stiffness and heat resistance.

Furthermore, an exemplary method for producing a photoelectric transducer of the present invention includes: a first electrode with a semiconductor layer carrying a sensitizing dye formed thereon; a second electrode opposed to the semiconductor layer of the first electrode; and an electrolyte layer placed between the semiconductor layer of the first electrode and the second electrode. A solution containing semiconductor particles and a binder is applied to the first electrode and dried, and then, pressed with a pressure of 20 to 200 MPa, whereby the semiconductor layer is formed.

According to the above, the semiconductor layer is formed by coating the first electrode with a solution containing semiconductor particles and a binder, followed by drying, and pressing the resultant electrode with a pressure of 20 to 200 MPa. Therefore, a semiconductor layer can be formed, which is capable of ensuring a conducting path for optically excited electrons even without being sintered at a high temperature, and handling the flexibility of a substrate.

Furthermore, in the method for producing a photoelectric transducer of one embodiment, it is preferable that a material for the semiconductor particles contained in the semiconductor layer is titanium oxide, and a decrease ratio of a half-width of a diffraction intensity peak attributed to a (101) plane of an anatase type crystal structure of the titanium oxide measured by an X-ray diffraction analysis method before and after pressing with a pressure of 20 to 200 MPa is in a range of 5 to 50%. If the material for the semiconductor particles contained in the semiconductor layer is titanium oxide, photodissolution in an electrolyte solution can be avoided, and high photoelectric conversion characteristics are obtained. Furthermore, if the decrease ratio of a half-width is in the above range, the crystal particle size of titanium oxide particles increases and the titanium oxide particles bind each other. Thus, the semiconductor layer having an appropriate porosity can be formed, in which a path for optically excited electrons can be formed.

Furthermore, in the method for producing a photoelectric transducer of one embodiment, it is preferable that a ratio of the binder contained in the semiconductor layer is in a range of 0.2 to 10% by mass with respect to a total component forming the semiconductor layer. This is because a conversion efficiency is enhanced further in this range.

Furthermore, in the method for producing a photoelectric transducer of one embodiment, it is preferable that the binder contains at least one selected from the group consisting of a cellulose derivative, a rubber elastic polymer, a single polymer or a copolymer of N-vinylacetamide, polyethylene oxide, sodium alginate, polyacrylic acid and its salt, polyvinylphenol, polyvinyl methyl ether, polyvinyl alcohol, polyvinyl pyrolidone, polyacrylamide, polyhydroxy(meth)acrylate, polyvinyl acetal, a styrene-maleic acid copolymer, polyethylene glycol, starch oxide, phosphorylated starch, casein, and polyolefin. These materials have strong adhesion and are sufficiently flexible, so that a semiconductor layer capable of handling the flexibility of a substrate more pliably can be realized.

Furthermore, in the method for producing a photoelectric transducer of one embodiment, it is preferable that the first electrode is configured with an electrode portion adhering to a synthetic resin film. According to this, electrodes can be mass-produced easily, resulting in a reduction in a production cost.

Furthermore, in the method for producing a photoelectric transducer of one embodiment, it is preferable that the synthetic resin film is at least one selected from the group consisting of a polyethylene terephthalate film, a polyethylene naphthalate film, a polyether sulphone film, a polyarylate film, a polyimide film, a cycloolefin polymer film, and a norbornene resin film. This is because these films are excellent in stiffness and heat resistance.

Hereinafter, the present invention will be described by way of embodiments with reference to the drawings. FIG. 1 is a schematic cross-sectional view showing an exemplary photoelectric transducer of the present invention. As shown, a photoelectric transducer 1 of the present embodiment has an electrode 5 first electrode) formed on one surface of a substrate 3. On one surface of the electrode 5, a semiconductor layer 7 carrying a sensitizing dye is formed. Furthermore, a counter electrode 9 (second electrode) is present so as to be opposed to the semiconductor 7 carrying a sensitizing dye. The counter electrode 9 is formed on one surface of another substrate 11. An electrolyte layer 13 is present between the semiconductor layer 7 and the counter electrode 9.

The inventors of the present invention earnestly studied so as to solve the conventional problems, and found that by forming the semiconductor layer 7 of semiconductor particles and a binder, a photoelectric transducer exhibiting excellent photoelectric conversion characteristics can be realized, which uses a semiconductor layer with strong adhesion capable of ensuring a conducting path for optically excited electrons without being sintered at a high temperature and handling the flexibility of a substrate. The effect (binder effect) of adding a binder in the present invention is to reduce cracking occurring in the semiconductor layer 7, and also is to enhance the adhesion between the semiconductor layer 7 and a flexible substrate. In the conventional finding, it has been believed that impurities other than a semiconductor should not be present in a semiconductor layer in order to prevent the inhibition of electron transfer by the impurities. Therefore, the addition of a surfactant in an amount of as much as 40% by mass to titanium oxide as described in WO 93/20569 has an adverse effect for obtaining sufficient light current output characteristics, although it can reduce cracking of a titanium oxide film. Furthermore, as described in WO 00/72373, even if a binder is not added to titanium oxide, the mechanical strength of a titanium oxide film can be enhanced to some degree by applying a large pressure thereto; however, it is difficult to obtain adhesion capable of handling the flexibility of a substrate. Based on this, the inventors of the present invention found that by selecting a binder that can exhibit a sufficient binder effect when added in a small amount and applying a pressure to the semiconductor layer 7 with the binder added thereto, a porous semiconductor layer 7 can be formed that does not require sintering and has excellent adhesion with respect to a substrate, thereby solving the problems concerned in the conventional finding.

As the binder that can exhibit a sufficient binder effect when added in a small amount, for example, a cellulose derivative, a rubber elastic polymer, a homopolymer or a copolymer of N-vinylacetamide, polyethylene oxide, sodium alginate, polyacrylic acid and its salt, polyvinylphenol, polyvinyl methyl ether, polyvinyl alcohol, polyvinyl pyrolidone, polyacrylamide, polyhydroxy(meth)acrylate, polyvinyl acetal, a styrene-maleic acid copolymer, polyethylene glycol, starch oxide, phosphorylated starch, casein, polyolefin, and the like can be used singly or in combination.

Among them, the cellulose derivative is more preferable as it allows semiconductor particles to bind each other even when added in a small amount, compared with other binders with the same molecular weight. Examples of the cellulose derivative include cellulose, methyl cellulose, ethyl cellulose, hydroxypropyl cellulose, hydroxypropyl methylcellulose, hydroxyethyl cellulose, hydroxyethyl methylcellulose, carboxymethyl cellulose, diacetyl cellulose, and the like. Herein, the cellulose derivative may be in a form such as a sodium salt, an ammonium salt, or the like.

Furthermore, the rubber elastic polymer is more preferable as it can alleviate strain occurring in the semiconductor layer 7 due to the flexibility of a substrate to enhance the adhesion between the substrate and the semiconductor layer 7. Examples of the rubber elastic polymer include natural rubber, isoprene rubber, butadiene rubber, butyl rubber, silicone rubber, fluorine rubber, polystyrene rubber, nitrile rubber, polystyrene butadiene rubber, chloroprene rubber, urethane rubber, poly(styrene ethylene) rubber, an ethylenepropylenediene methylene copolymer, polyacetal, polyurethane rubber, and the like. Herein, the rubber elastic polymer may contain a polar group such as a carboxyl group and an alkoxycarbonyl group.

Furthermore, among the above-mentioned binders, those which form thermosetting resin insoluble in a solvent when being reacted with a crosslinker known to those skilled in the art are more preferable as they can provide the semiconductor layer 7 with resistance to an organic solvent that is a component of the electrolyte layer 13. For example, polyvinyl acetal can be used as thermosetting resin insoluble in a solvent by being cross-linked with phenol resin, epoxy resin, melamine resin, isocyanate, dialdehyde, or the like.

The porosity of the semiconductor layer 7 should be in a range of 40 to 80%. The porosity in the present invention is represented by a percentage of a pore volume with respect to the total volume of the semiconductor layer 7 including pores thereof, with the total volume of pores included in the semiconductor layer 7 being defined as a pore volume. In order to obtain a pore volume, an adsorption/desorption isotherm is measured with a pore distribution measurement apparatus "ASAP 2010" (produced by Micromeritics), and the volume of each pore with a pore diameter in a range of 1.7 to 300 nm is accumulated from a BJH desorption pore distribution plot to calculate the pore volume. The total volume of the semiconductor layer 7 including pores thereof is a sum of a pore volume and a volume of a solid component of the semiconductor layer 7. The volume of the solid component of the semiconductor layer 7 can be obtained by measuring the density of the solid component with a densimeter. When the porosity of the semiconductor layer 7 is smaller than 40%, the contact area between the semiconductor layer 7 and the electrolyte solution becomes small to degrade photoelectric conversion characteristics. Furthermore, when the porosity of the semiconductor layer 7 exceeds 80%, the semiconductor layer 7 becomes brittle, and its adhesion with respect to a flexible substrate is degraded.

Examples of a press for applying a pressure for forming the semiconductor layer 7 include, but are not particularly limited to, a flat press, a roll press, and the like. The roll press is preferable since a conductive film as a substrate can be produced continuously by a roll-to-roll manufacturing process.

Furthermore, when a pressure is applied to the semiconductor layer 7, it is preferable to interpose a release material between a press and the semiconductor layer 7. This prevents the semiconductor layer 7 from adhering to the press to peel off from the electrode 5. As a material for the release material, fluorine resin is preferable, such as polytetrafluoroethylene (PTFE), polychlorotrifluoroethylene (PCTFE), a tetrafluoroethylene hexafluoropropylene copolymer (FEP), perfluoroalkoxy fluorocarbon (PFA), polyvinylidene fluoride (PVDF), an ethylene-tetrafluoroethylene copolymer (ETFE), ethylene-chlorotrifluoroethylene copolymer (ECTFE), polyvinyl fluoride (PVF), and the like.

The inventors of the present invention confirmed the following phenomenon by a scanning electron microscope: in the case of using titanium oxide particles as semiconductor particles contained in the semiconductor layer 7, when a pressure is applied to the semiconductor layer 7, the particle size of the titanium oxide particles increases. The inventors studied this phenomenon earnestly, and consequently found that the increase in the particle size of the titanium oxide particles is correlated with the decrease in a half-width of a diffraction intensity peak attributed to a (101) plane of an anatase type crystal structure of titanium oxide measured by an X-ray diffraction analysis method. That is, it is inferred that when a pressure is applied to titanium oxide particles, adjacent titanium oxide particles bind each other to proceed crystal growth, whereby the particle size of the titanium oxide particles increases. This finding can be used as the ground for supporting that when a pressure of 20 to 200 MPa is applied to the semiconductor layer 7, a conducting path for optically excited electrons can be ensured even without sintering the semiconductor layer 7 at a high temperature. The half-width of a diffraction intensity peak attributed to a (101) plane of an anatase type crystal structure of titanium oxide can be obtained from measurement of an X-ray diffraction profile of the semiconductor layer 7 containing titanium oxide, using an X-ray diffraction analysis apparatus "RINT 2500V/PC" (produced by Rigaku Denki Co., Ltd.). The decrease ratio of a half-width in the present invention is a numerical value representing, by a percentage, a decrease amount of the half-width of the semiconductor layer 7 containing titanium oxide after pressing, with respect to the half-width of the semiconductor layer 7 containing titanium oxide before pressing.

In the present embodiment, as a material for the substrate 3, glass or a film is used. However, it is preferable that a flexible film is used as a substrate since it is easy to apply a pressure to the semiconductor layer 7. Furthermore, since the substrate 3 functions as a light incident substrate, a film preferably is transparent. Examples of the transparent film include a regenerated cellulose film, a diacetate cellulose film, a triacetate cellulose film, a tetraacetyl cellulose film, a polyethylene film, a polypropylene film, a polyvinyl chloride film, polyvinylidene chloride film, a polyvinyl alcohol film, a polyethylene terephthalate film, polycarbonate film, a polyethylene naphthalate film, a polyether sulphone film, a polyether ether ketone film, a polysulfone film, polyetherimide film, a polyimide film, a polyarylate film, cycloolefin polymer film, a norbornene resin film, a polystyrene film, a rubber hydrochloride film, a nylon film, a polyacrylate film, polyvinylfluoride film, polytetrafluoroethylene film, and the like. Among them, in particular, the polyethylene terephthalate film, the polyethylene naphthalate film, the polyether sulphone film, the polyimide film, the polyarylate film, the cycloolefin polymer film, and the norbornene resin film are preferable as having stiffness and being excellent in heat resistance. Furthermore, if the substrate 11 is allowed to function as a light incident substrate, a metal foil of nickel, zinc, titanium, or the like can be used as a film of the substrate 3.

It is preferable that the particle size of semiconductor particles generally is in a range of 5 to 1000 nm for the following reason. In this range, the pore diameter of the semiconductor layer 7 becomes appropriate, and an electrolyte permeates sufficiently the semiconductor layer 7, whereby excellent photoelectric conversion characteristics can be obtained. A particularly preferable range of a particle size of semiconductor particles is 10 to 100 nm.

The film thickness of the semiconductor layer 7 preferably is in a range of 0.1 to 100 μm. In this range, sufficient photoelectric conversion effects are obtained, and also, the transparency with respect to visible light and near-infrared light may not be degraded. The film thickness of the semiconductor layer 7 is more preferably in a range of 1 to 50 μm, particularly preferably in a range of 5 to 30 μm, and most preferably in a range of 10 to 20 μm.

The semiconductor layer 7 can be formed by coating a surface of the electrode 5 with a solution containing semiconductor particles and a binder, for example, by a coating method using a doctor blade, a bar coater, etc., a spray method, dip coating, screen printing, spin coating, or the like, and thereafter, applying a pressure to the electrode 5 with the above-mentioned press.

Examples of the semiconductor material include oxides of metal elements such as Cd, Zn, In, Pb, Mo, W, Sb, Bi, Cu, Hg, Ti, Ag, Mn, Fe, V, Sn, Zr, Sr, Ga, Si, Cr, and the like; perovskite such as $SrTiO_3$, $CaTiO_3$, and the like; sulfides such as CdS, ZnS, $In_2S_3$, PbS, $Mo_2S$, $WS_2$, $Sb_2S_3$, $Bi_2S_3$, $ZnCdS_2$, $Cu_2S$, and the like; metal chalcogenide such as CdSe, $In_2Se_3$, $WSe_2$, HgS, PbSe, CdTe, and the like; GaAs, Si, Se, $Cd_2P_3$, $Zn_3P_2$, InP, AgBr, $PbI_2$, $HgI_2$, $BiI_3$, and the like. Alternatively, examples of the semiconductor material include complexes containing at least one selected from the above-mentioned semiconductor materials, such as $CdS/TiO_2$, CdS/AgI, $Ag_2S/AgI$, CdS/ZnO, CdS/HgS, CdS/PbS, ZnO/ZnS, ZnO/ZnSe, CdS/HgS, $CdS_x/CdSe_{1-x}$, $CdS_x/Te_{1-x}$, $CdSe_x/Te_{1-x}$, ZnS/CdSe, ZnSe/CdSe, CdS/ZnS, $TiO_2/Cd_3P_2$, CdS/CdSeCd$_y$Zn$_{1-y}$S, CdS/HgS/CdS, and the like. Among them, $TiO_2$ is preferable in the Graetzel cell in terms of the avoidance of photodissolution in an electrolyte solution and high photoelectric conversion characteristics.

The substrate 11 can be made of the same material as that for the substrate 3. The substrate 11 may be transparent or opaque. However, the substrate 11 preferably is transparent in that light can be incident upon both sides of the substrate. In the case where a metal foil is used as a film of the substrate 3, it is preferable that the substrate 11 is made of the above-mentioned material having light transparency.

The electrode 5 formed on one surface of the substrate 3 functions as a negative electrode of the photoelectric transducer 1, and is formed of metal or by depositing a conductive layer on a film. Examples of the preferable conductive material include metal such as platinum, gold, silver, copper, aluminum, rhodium, indium, and the like; carbon; or conductive metal oxides such as an indium-tin complex oxide, an antimony-doped tin oxide, fluorine-doped tin oxide, and the like.

The electrode 5 desirably has a lowest possible surface resistance. A preferable range of the surface resistance is 50 Ω/square or less, and more preferably 30 Ω/square or less. Although there is no particular lower limit, the lower limit generally is 0.1 Ω/square.

The electrode 5 desirably has a highest possible light transmittance. The light transmittance preferably is at least 50%, and preferably at least 80%. The film thickness of the electrode 5 preferably is in a range of 0.1 to 10 μm for the following reasons. In this range, an electrode film with a uniform film thickness can be formed. Furthermore, sufficient light can be incident upon the semiconductor layer 7 without decreasing light transparency. In the case of using a transparent electrode 5, it is preferable that light is incident from the side of the electrode 5 on which the semiconductor layer 7 carrying a sensitizing dye is formed.

The counter electrode 9 functions as a positive electrode of the photoelectric transducer 1, and can be formed in a similar manner to the electrode 5 on which the semiconductor layer 7 carrying a sensitizing dye is formed. As the counter electrode 9 of the photoelectric transducer 1 in the present embodiment, it is preferable to use a material having a catalytic function of providing electrons to a reductant of an electrolyte so as to allow the counter electrode 9 to efficiently work as a positive electrode of the photoelectric transducer 1. Examples of such a material include metal such as platinum, gold, silver, copper, aluminum, rhosium, indium, and the like; graphite; carbon carrying platinum; conductive metal oxides such as an indium-tin complex oxide, antimony-doped tin oxide, fluorine-doped tin oxide, and the like. Among them, platinum and graphite particularly are preferable. The substrate 11 on which the counter substrate 9 is placed also can have a transparent conductive film (not shown) on the side where the counter electrode 9 is placed. The transparent conductive film can be formed of, for example, the same above-mentioned material as that for the electrode 5. In this case, it is preferable that the counter electrode 9 also is transparent.

As the sensitizing dye, any dye can be used as long as it generally is used in a conventional dye-sensitized photoelectric transducer. Examples of such a dye include a ruthenium-cis-diaqua-bipyridyl complex of a $RuL_2 (H_2O)_2$ type; a transition metal complex of a ruthenium-tris ($RuL_3$), ruthenium-bis ($RuL_2$), osnium-tris ($OsL_3$), osnium-bis ($OsL_2$) type (herein, L represents 4,4'-dicarboxyl-2,2'-bipyridine); zinc-tetra (4-carboxyphenl)porphyrin, an iron-hexacyanide complex, phthalocyanine, and the like. Examples of the organic dye include a 9-phenylxanthene dye, a coumarin dye, an acridine dye, a triphenylmethane dye, a tetraphenylmethane dye, a quinone dye, an azo dye, an indigo dye, a cyanine dye, a merocyanine dye, a xanthene dye, and the like. Among them, the rhutenium-bis (RuL$_2$) derivative particularly is preferable as having a wide absorption spectrum in a visible light range.

As a method for allowing the semiconductor layer 7 to carry a sensitizing dye, for example, there is a method for soaking the substrate 3 having the electrode 5 with the semiconductor layer 7 formed thereon in a solution in which a sensitizing dye is dissolved. As a solvent of this solution, any solvent such as water, alcohol, toluene, dimethylformamide, and the like can be used as long as it can dissolve a sensitizing dye. Furthermore, as a soaking method, while the substrate 3 having the electrode 5 with the semiconductor layer 7 formed thereon is soaked in a sensitizing dye solution for a predetermined period of time, heating reflux and application of an ultrasonic wave can be performed. After allowing the semiconductor layer 7 to carry a sensitizing dye, in order to remove the sensitizing dye remaining on the semiconductor layer 7 without being carried thereon, it is desirable that the semiconductor layer 7 is washed with alcohol or refluxed by heating.

The amount of a sensitizing dye to be carried on semiconductor particles may be in a range of $1 \times 10^{-8}$ to $1 \times 10^{-6}$ mol/cm$^2$, and in particular, preferably in a range of $0.1 \times 10^{-7}$ to $9.0 \times 10^{-7}$ mol/cm$^2$. In this range, the effect of enhancing a photoelectric conversion efficiency can be obtained economically and sufficiently.

There is no particular limit to an electrolyte to be used in the electrolyte layer 13 in the photoelectric transducer 1 of the present embodiment, as long as a pair of oxidation-reduction constituent materials made of an oxidant and a reductant is contained in a solvent. Oxidation-reduction constituent materials in which an oxidant and a reductant have the same charge are preferable. The oxidation-reduction constituent materials in the present invention refer to a pair of materials present in the form of an oxidant and a reductant reversibly in an oxidation-reduction reaction. Examples of the oxidation—reduction constituent materials that can be used in the present embodiment include chlorine compound—chlorine, iodine compound—iodine, bromine compound—bromine, thallium ion (III)—thallium ion (I), mercury ion (II)—mercury ion (I), rhutenium ion (III)—rhutenium ion (II), copper ion (II)—copper ion (I), iron ion (III)—iron ion (II), vanadium ion (III)—vanadium ion (II), manganic acid ion—permanganic acid ion, ferricyanide—ferrocyanide, quinone—hydroquinone, fumaric acid—succinic acid, and the like. Needless to say, other oxidation-reduction constituent materials also can be used. Among them, the iodine compound-iodine is preferable. As the iodine compound, in particular, metal iodides such as lithium iodide, potassium iodide, and the like; iodinated quarternary ammonium salt compounds such as tetraalkylammonium iodide, pyridinium iodide, and the like; iodated imidazolium compounds such as iodated dimethylpropyl imidazorium are preferable.

As the solvent used for dissolving the electrolyte, a compound that dissolves the oxidation-reduction constituent material and is excellent in ion conductivity is preferable. As the solvent, both an aqueous solvent and an organic solvent can be used. However, in order to further stabilize the oxidation-reduction constituent material, the organic solvent is preferable. Examples of the organic solvent include carbonate compounds such as dimethyl carbonate, diethyl carbonate, methyl ethyl carbonate, ethylene carbonate, propylene carbonate, and the like; ester compounds such as methyl acetate, methyl propionate, γ-butylolactone, and the like; ether compounds such as diethyl ether, 1,2-dimethoxyethane, 1,3-dioxosilane, tetrahydrofuran, 2-methyl-tetrahydrofuran, and the like; heterocyclic compounds such as 3-methyl-2-oxazolidinone, 2-methylpyrrolidone, and the like; nitrile compounds such as acetonitrile, methoxyacetonitrile, propionitrile, and the like; aprotic polar compounds such as sulfolane, didimethylsulfoxide, dimethylformamide, and the like. They can be used singly or in combination of two or more kinds. Among them, in particular, the carbonate compounds such as ethylene carbonate and propylene carbonate; the heterocyclic compounds such as 3-methyl-2-oxazolidinone and 2-methylpyrrolidone; and the nitrile compounds such as acetonitrile, methoxyacetonitrile, propionitrile, 3-methoxypropionitrile, and nitrile valerate are preferable.

Hereinafter, the present invention will be described more specifically by way of examples. It should be noted that the present invention is not limited to these examples.

EXAMPLE 1

First, 2.5 g of carboxymethyl cellulose (CMC) "1180" produced by Daicel Chemical Industries, Ltd. was dissolved in 497.5 g of water to prepare 0.5% by mass of a CMC aqueous solution. Then, 4.5 g of titanium oxide "P25" produced by Nippon Aero Gel Co., Ltd was placed in 25.5 g of the CMC aqueous solution. The resultant mixture was subjected to the Planet Ball Mill to prepare a dispersion of titanium oxide. The dispersion was prepared so that the content of titanium oxide therein was 15% by mass. The dispersion was applied by squeezing to a polyethylene terephthalate (PET) film (ITO/PET film with a thickness of 125 μm and a sheet resistance of 10 Ω/square) with an indium-tin oxide (ITO) produced by Oji Tobi Co., Ltd. formed thereon, and dried with hot air to form a titanium oxide film on the PET film. Then, a pressure shown in Table 1 was applied to the titanium oxide film by a press to form a titanium oxide film with a thickness of 8 μm. When the pressure was applied, a fluororesin sheet "Nitoflon" produced by Nitto Denko Corporation was interposed between the press and the titanium oxide film. The reason for this is to improve the releasing property between the press and the titanium oxide film so as to prevent the titanium oxide film from peeling off from the ITO/PET film.

The pore volume of the resultant titanium oxide film was obtained by measuring an adsorption/desorption isotherm by a pore distribution measurement apparatus "ASAP 2010" (produced by Micromeritics), and accumulating a volume of each pore with a pore diameter in a range of 1.7 to 300 nm from a BJH desorption pore distribution plot. Furthermore, the volume of a solid component was obtained by measuring the density of a solid component of the resultant titanium oxide film by a densimeter. The porosity of the resultant titanium oxide film was calculated from the pore volume of the resultant titanium oxide film and the volume of the solid component thereof. The porosity of the resultant titanium oxide film was 64% under a pressure of 20 MPa, 48% under a pressure of 100 MPa, and 40% under a pressure of 200 MPa.

The ITO/PET film with the titanium oxide film was soaked in an acetonitrile/4-tert-butanol mixed solution (mixed volume ratio=50/50) containing $3 \times 10^{-4}$ mol/dm$^3$ of a sensitizing dye represented by [Ru(4,4'-dicarboxyl-2,2'-bipyridine)$_2$(NCS)$_2$]bis-tetrabutylammonium for 10 hours, whereby a treatment for allowing the ITO/PET film to carry a dye was performed.

The semiconductor electrode thus obtained and its counter electrode were brought into contact with an electrolyte solution to constitute a photoelectric transducer. In this case, as the counter electrode, an ITO/PET film produced by Oji Tobi Co., Ltd. with platinum vapor-deposited thereon to a thickness of 20 nm was used. In order to keep the distance between the electrodes constant, a "Bynel" sheet (thickness: 30 μm) produced by Dupont that is a hot-melt resin was attached to the periphery of the titanium oxide film as a spacer. The "Bynel" sheet also functions as a sealant of the electrolyte solution. Furthermore, in order to prevent the titanium oxide film from coming into contact with the platinum of the counter electrode due to the flexibility of the ITO/PET film to cause a partial short-circuit, a non-woven fabric made of polybutylene terephthalate (PBT) was interposed between the titanium oxide film and the counter electrode. As the electrolyte solution, 3-methoxypropionitrile containing 0.5 mol/dM$^3$ of lithium iodide, 0.05 mol/dM$^3$ of iodine, and 0.5 mol/dM$^3$ of 4-tert-butyl pyridine was used.

The conversion efficiency of the photoelectric transducer of the present embodiment was measured by irradiating a sample cell (light-receiving area: 0.64 cm$^2$) with pseudo sunlight (AM1.5, 10 mW/cm$^2$). Table 1 shows the results.

TABLE 1

| | Pressure (MPa) | | | | | | | | |
|---|---|---|---|---|---|---|---|---|---|
| | 0 | 10 | 20 | 40 | 60 | 80 | 100 | 150 | 200 | 250 |
| Conversion efficiency (%) | 0 | 1.5 | 2.9 | 3.5 | 3.7 | 4.2 | 5.0 | 4.9 | 4.4 | 1.2 |

As is apparent from Table 1, when the pressure of the press was lower than 20 MPa, the conversion efficiency was decreased. The reason for this is considered as follows: due to the small pressure of the press, the semiconductor layer becomes brittle, and the adhesion thereof with respect to the substrate becomes weak; as a result, an electron conducting path of the semiconductor layer cannot be ensured sufficiently. Furthermore, when the pressure of the press was more than 200 MPa, the conversion efficiency was decreased. The reason for this is considered as follows: since the pressure of the press is too large, the porosity of the semiconductor layer is decreased excessively, whereby the contact between the semiconductor layer and the electrolyte solution becomes insufficient.

In contrast, in the case where the pressure of the press was in a range of 20 to 200 MPa, in spite of the fact that CMC was contained in the titanium oxide film in an amount of 2.8% by mass, a sufficient conversion efficiency was obtained.

EXAMPLE 2

A binder solution was prepared in which ethyl cellulose "N300" produced by Hercules Incorporated was dissolved in ethanol in a ratio shown in Table 2. Then, 6 g of titanium oxide "P25" produced by Nippon Aero Gel Co., Ltd. was placed in 24 g of the binder solution. The mixture thus obtained was subjected to the Planet Ball Mill to prepare a dispersion of titanium oxide. The dispersion was prepared so that the content of titanium oxide in the dispersion was 20% by mass. The dispersion was applied by squeezing to a polyethylene naphthalate (PEN) film (ITO/PEN film with a thickness of 125 μm and a sheet resistance of 10 Ω/square) with an indium-tin oxide (ITO) produced by Oji Tobi Co., Ltd. formed thereon, and dried with hot air to form a titanium oxide film on the PEN film. Then, a pressure of 100 MPa was applied to the titanium oxide film by a press to form a titanium oxide film with a thickness of 15 μm. When the pressure was applied, a press surface of the press was coated with fluorine resin coating to improve the releasing property between the titanium oxide film and the press surface. The porosity of the resultant titanium oxide film was measured by the method described in Example 1. As a result, the porosity was 53% when the addition ratio of the binder was 2% by mass.

A semiconductor electrode thus produced was assembled into a photoelectric transducer by the same method as that in Example 1. The conversion efficiency was measured by irradiating a sample cell (light-receiving area: 0.64 cm$^2$) with pseudo sunlight (AM1.5, 10 mW/cm$^2$). Table 2 shows the results.

TABLE 2

| Ratio of ethyl cellulose (% by mass) | 0 | 0.01 | 0.05 | 0.1 | 0.5 | 1 | 2 | 2.5 | 3 |
|---|---|---|---|---|---|---|---|---|---|
| Addition ratio of a binder (% by mass) | 0 | 0.04 | 0.2 | 0.4 | 2 | 4 | 8 | 10 | 12 |
| Conversion efficiency (%) | 4.1 | 4.3 | 4.6 | 4.6 | 4.8 | 4.8 | 4.7 | 4.4 | 4.2 |
| Film peeling | Yes | Yes | No | No | No | No | No | No | No |

In Table 2, the ratio of ethyl cellulose refers to the ratio of the mass of ethyl cellulose with respect to the mass of an entire binder solution. The addition ratio of a binder refers to the ratio of the mass of ethyl cellulose with respect to the mass of an entire titanium oxide film. Furthermore, regarding the determination of film peeling, the case where the titanium oxide film was subjected to press forming, and then, the titanium oxide film remained 99% or more (0.63 cm$^2$ or more in terms of an area) of the coating area (0.64 cm$^2$) on the ITO/PEN film was defined as "No", and the case where the remaining amount of the titanium oxide film was smaller than 99% was defined as "Yes".

In the case where the addition ratio of the binder was 0.04% by mass or less, although peeling was confirmed in an edge portion of the titanium oxide film after press forming, the conversion efficiency was maintained at a practical level. When the addition ratio of the binder was 0.2% by mass or more, the conversion efficiency was enhanced, and film peeling did not occur. Furthermore, when the addition ratio of the binder exceeded 10% by mass, the conversion efficiency exhibited a tendency to decrease.

EXAMPLE 3

First, 2.5 g of carboxymethyl cellulose (CMC) "1180" produced by Daicel Chemical Industries, Ltd. was dissolved in 497.5 g of water to prepare 0.5% by mass of a CMC aqueous solution. Then, 4.5 g of titanium oxide "P25" produced by Nippon Aero Gel Co., Ltd. and polystyrene butadiene rubber (SBR) produced by JSR were placed in a ratio shown in Table 3 in 25.5 g of the CMC aqueous solution. The resultant mixture was subjected to the Planet Ball Mill to prepare a dispersion of titanium oxide. The dispersion was prepared so that the content of titanium oxide therein was 15% by mass. The dispersion was applied by squeezing to an ITO/PEN film (thickness: 125 μm; sheet resistance: 10 Ω/square) produced by Oji Tobi Co., Ltd., and dried with hot air to form a titanium oxide film on the ITO/PEN film. Then, a pressure of 100 MPa was applied by a press, whereby a titanium oxide film with a length of 20 mm, a width of 20 mm, and a thickness of 12 μm was formed. When the pressure was applied, a press surface of the press was coated with fluorine resin coating to improve the releasing property between the titanium oxide film and the press surface. The porosity of the resultant titanium oxide film was measured by the method described in Example 1. As a result, the porosity was 48% when the addition ratio of SBR was 0% by mass, and the porosity was 42% when the addition ratio of SBR was 1.0%.

A cellophane tape with a width of 12 mm was attached to the titanium oxide film thus obtained. Then, a peeling test (90° peeling test) was conducted in which the cellophane tape was pulled at an angle of 90° with respect to an attachment surface, and whether the titanium oxide film was subjected to interfacial peeling with respect to the ITO/PEN film or the titanium oxide film was subjected to cohesive failure was observed. Table 3 shows the results.

TABLE 3

| Addition ratio of SBR (% by mass) | 0 | 0.1 | 0.5 | 1.0 |
|---|---|---|---|---|
| Addition ratio of a binder (% by mass) | 2.8 | 4.0 | 6.8 | 10.7 |
| 90° peeling test | Acceptable | Satisfactory | Satisfactory | Satisfactory |

In Table 3, the addition ratio of SBR refers to the ratio of a mass of SBR with respect to the mass of an entire titanium oxide dispersion. The addition ratio of a binder refers to the ratio of a total mass of ethyl cellulose and SBR with respect to the total mass of the titanium oxide film. Furthermore, regarding the determination of the 90° peeling text result, the case where the titanium oxide film after the test completely peeled off from the interface was defined as "unacceptable". The case where the titanium oxide film partially peeled off from the interface was defined as "partially unacceptable". The case where the titanium oxide film did not peel off from the interface, and was only subjected to cohesive failure was defined as "acceptable". The case where even cohesive failure was not observed was defined as "satisfactory".

By adding 2.8% by mass or more of the binder to the titanium oxide film, interfacial peeling between the titanium oxide film and the ITO/PEN film was not observed. Furthermore, by adding SBR, the titanium oxide film was prevented from being subjected to cohesive failure.

EXAMPLE 4

First, a mixture containing 100 parts by mass of titanium oxide "P25" produced by Nippon Aero Gel Co., Ltd., 4 party by mass of polyvinyl butyral "S-Lec B" produced by Sekisui Kagaku, 2 parts by mass of dibutyl phthalate, 6 parts by mass of acetylacetone, and 396 parts by mass of toluene/ethyl methyl ketone (mixed volume ratio=50/50) was subjected to the Planet Ball Mill to prepare a dispersion of titanium oxide. Two parts by mass of "Colonate" (isocyanate produced by Nippon Polyurethane Industry Co., Ltd.) was added to the dispersion as a crosslinker. The dispersion was applied by squeezing to an ITO/PEN film (thickness: 125 μm; sheet resistance 10 Ω/square), and was dried with hot air to form a titanium oxide film on the ITO/PEN film. The titanium oxide film on the ITO/PEN film was allowed to stand in a drier at 60° C. for 20 hours, whereby polyvinyl butyral in the titanium oxide film was cross-linked with isocyanate. Then, a pressure of 100 MPa was applied to the titanium oxide film with a press to form a titanium oxide film with a thickness of 15 μm. When the pressure was applied, a press surface of the press was coated with fluorine resin coating to improve the releasing property between the titanium oxide film and the press surface. The porosity of the resultant titanium oxide film was measured by the method described in Example 1. As a result, the porosity was 58%.

The titanium oxide film thus obtained was subjected to a 90° peeling test in the same process as that in Example 3. The resultant titanium oxide film did not peel off from the interface with respect to the ITO/PEN film, and was not subjected to cohesive failure.

EXAMPLE 5

An ethanol solution in which 0.5% by mass of ethyl cellulose "N300" produced by Hercules Incorporated was dissolved was prepared. Then, 6 g of titanium oxide "P25" produced by Nippon Aero Gel Co., Ltd. was placed in 24 g of the ethanol solution. The mixture thus obtained was subjected to the Planet Ball Mill to prepare a dispersion of titanium oxide. The content of titanium oxide in the dispersion was 20% by mass, and the content of ethyl cellulose was 2% by mass. The dispersion was applied by squeezing to an ITO/PEN film (thickness: 125 μm; sheet resistance: 10 Ω/square) produced by Oji Tobi Co., Ltd., and dried with hot air to form a titanium oxide film on the ITO/PEN film. Then, a pressure shown in Table 4 was applied to the titanium oxide film by a press. When the pressure was applied, a press surface of the press was coated with fluorine resin coating to improve the releasing property between the titanium oxide film and the press surface. The porosity of the resultant titanium oxide film was measured by the method described in Example 1. Table 4 shows the results.

A semiconductor electrode thus produced was assembled into a photoelectric transducer by the same method as that in Example 1. The conversion efficiency of the photoelectric transducer was measured by irradiating a sample cell (light-receiving area: 0.64 cm$^2$) with pseudo sunlight (AM1.5, 10 mW/cm$^2$). Table 4 shows the results.

TABLE 4

| | Pressure (MPa) | | | | | | |
|---|---|---|---|---|---|---|---|
| | 8 | 20 | 60 | 100 | 150 | 200 | 220 |
| Porosity (%) | 85 | 68 | 62 | 53 | 46 | 42 | 35 |
| Conversion efficiency (%) | 1.3 | 3.5 | 4.8 | 5.0 | 4.6 | 4.2 | 2.3 |

A pressure in a range of 20 to 200 MPa shown in Table 4 was applied to the titanium oxide film, whereby a porous titanium oxide film enabling a sufficient conversion efficiency to be obtained was produced. When the porosity of the titanium oxide film exceeded 80%, it was difficult to produce a titanium oxide film with good adhesion on the ITO/PEN film. Furthermore, when the porosity of the titanium oxide film was smaller than 40%, a sufficient conversion efficiency was not obtained with good reproducibility.

EXAMPLE 6

A titanium oxide film was formed on an ITO/PEN film (thickness: 125 μm; sheet resistance: 10 Ω/square) produced by Oji Tobi Co., Ltd. in the same way as in Example 5. Then, a pressure shown in Table 5 was applied to the titanium oxide film with a press to form a titanium oxide film. When the pressure was applied, a press surface of the press was coated with fluorine resin coating to improve the releasing property between the titanium oxide film and the press surface. An X-ray diffraction profile of the resultant titanium oxide film was measured by an X-ray diffraction analysis apparatus "RINT 2500 V/PC" (produced by Rigaku Denki Co., Ltd.), and a half-value of a diffraction intensity peak attributed to a (101) plane of an anatase type crystal structure of titanium oxide was obtained. Table 5 shows a decrease ratio of a half-width at each pressure, based on a half-width when a pressure is 0 MPa. The decrease ratio of a half-width was calculated by the following formula:

Decrease ratio of a half-width=[(Half-width at a pressure of 0 MPa)−(Half-width at each pressure)]/[Half-width at a pressure of 0 MPa]×100

TABLE 5

| | Pressure (MPa) | | | | | | |
|---|---|---|---|---|---|---|---|
| | 8 | 20 | 60 | 100 | 150 | 200 | 220 |
| Decrease ratio of a half-width (%) | 2.5 | 5.5 | 16.6 | 28.3 | 41.4 | 49.6 | 50.3 |

When a pressure shown in Table 5 was applied to the titanium oxide film, the decrease ratio of a half-width was increased. That is, it is inferred that when a pressure was applied to titanium oxide particles, adjacent titanium oxide particles bound each other to proceed crystal growth, whereby the particle size of the titanium oxide particles was increased. When the decrease ratio of a half-width was less than 5%, titanium oxide particles did not bind each other sufficiently due to the increase in particle size of the titanium oxide particles, so that a titanium oxide film was not produced with good adhesion on the ITO/PEN film. Furthermore, when the decrease ratio of a half-width exceeded 50%, the porosity of the titanium oxide film was decreased as shown in Table 4, so that a sufficient conversion efficiency was not obtained with good reproducibility.

INDUSTRIAL APPLICABILITY

The photoelectric transducer of the present invention can be used as a power source for portable electronic equipment, indoor electronic equipment, outdoor electronic equipment, vehicles, toys, a transportable generator, a residential generator, etc.

The invention claimed is:

1. A method for producing a photoelectric transducer comprising: a first electrode comprising a semiconductor layer carrying a sensitizing dye formed thereon; a second electrode opposed to the semiconductor layer of the first electrode; and an electrolyte layer placed between the semiconductor layer of the first electrode and the second electrode, the method comprising:
    applying a solution comprising semiconductor particles and a binder to the first electrode;
    drying the solution; and
    then, forming the semiconductor layer of the first electrode by pressing with a pressure of 20 to 200 MPa.

2. The method for producing a photoelectric transducer according to claim 1, wherein the semiconductor particles are titanium oxide and a decrease ratio of a half-width of a diffraction intensity peak attributed to a (101) plane of an anatase type crystal structure of the titanium oxide measured by an X-ray diffraction analysis method before and after pressing with a pressure of 20 to 200 MPa is in a range of 5 to 50%.

3. The method for producing a photoelectric transducer according to claim 1, wherein a ratio of the binder contained in the semiconductor layer is in a range of 0.2 to 10% by mass with respect to a total component forming the semiconductor layer.

4. The method for producing a photoelectric transducer according to claim 1, wherein the binder contains at least one selected from the group consisting of a cellulose derivative, a rubber elastic polymer, a single polymer or a copolymer of N-vinylacetamide, polyethylene oxide, sodium alginate, polyacrylic acid and its salt, polyvinylphenol, polyvinyl methyl ether, polyvinyl alcohol, polyvinyl pyrolidone, polyacrylamide, polyhydroxy(meth)acrylate, polyvinyl acetal, a styrene-maleic acid copolymer, polyethylene glycol, starch oxide, phosphorylated starch, casein, and polyolefin.

5. The method for producing a photoelectric transducer according to claim 1, wherein the first electrode is configured with an electrode portion adhering to a synthetic resin film.

6. The method for producing a photoelectric transducer according to claim 5, wherein the synthetic resin film is at least one selected from the group consisting of a polyethylene terephthalate film, a polyethylene naphthalate film, a polyether sulphone film, a polyarylate film, a polyimide film, a cycloolefin polymer film, and a norbornene resin film.

* * * * *